United States Patent
Hyde et al.

(10) Patent No.: US 8,942,719 B1
(45) Date of Patent: Jan. 27, 2015

(54) LOCATING A NEARBY MOBILE DEVICE WITHOUT USING GPS

(75) Inventors: Caleb Sisson Hyde, Kansas City, MO (US); Andrew Mark Wurtenberger, Olathe, KS (US); Clark Douglas Halferty, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 657 days.

(21) Appl. No.: 12/877,226

(22) Filed: Sep. 8, 2010

(51) Int. Cl.
*H04W 24/00* (2009.01)

(52) U.S. Cl.
USPC .................. 455/456.1; 455/411; 455/414.1; 726/4; 726/14; 726/17; 726/22; 713/152; 713/164; 713/166; 713/182

(58) Field of Classification Search
CPC ..... H04W 61/00; H04W 4/02; H04W 64/006; H04W 24/10; H04W 88/02; H04W 12/12; H04W 12/06; H04W 12/08; H04W 12/02; H04W 36/32; H04W 4/025; H04W 4/26; G01S 5/0252; G01S 5/0278; G01S 5/021; G01S 1/028; G01S 5/0054; G01S 5/02; G01S 2013/466; G01S 2013/468; G01S 19/16; H04M 1/72572; H04M 1/72577; H04M 2203/1016; H04M 2207/18; H04M 2242/14; H04M 2242/30; H04M 1/66; H04L 67/18; H04L 67/22; H04L 67/24; H04L 63/0407; H04L 2012/2841; H04L 12/5695; H04L 67/025; H04L 2209/80; G06Q 30/0267; G06Q 30/0261; G06F 2221/2111; G06F 2221/2113; G06F 2221/2149; G06F 21/88; G06F 21/00
USPC ............ 455/456.1, 411, 414.1; 726/4, 14, 17, 726/22; 713/152, 164, 166, 182
See application file for complete search history.

(56) References Cited

U.S. PATENT DOCUMENTS

| 6,121,881 | A  | * | 9/2000 | Bieback et al. | 340/573.1 |
| 6,433,685 | B1 | * | 8/2002 | Struble et al. | 340/571 |
| 6,813,498 | B1 | * | 11/2004 | Durga et al. | 455/456.1 |
| 2002/0008625 | A1 | * | 1/2002 | Adams et al. | 340/573.1 |
| 2011/0141276 | A1 | * | 6/2011 | Borghei | 348/143 |

OTHER PUBLICATIONS

Wireless 2-Way Find One Find All Key Finder, Wallet Finder http://www.findonefindall.com.
InstaMapper—Free Real-Time GPS Tracking http://www.instamapper.com/android.
Zomm! Alarmingly Smart Wire Leash for Mobile Phones http://zomm.com.

* cited by examiner

*Primary Examiner* — Nimesh Patel

(57) ABSTRACT

A method, system, and medium are provided for locating a lost mobile device utilizing a radio frequency signal associated with the lost mobile device. One embodiment of the method includes activating a signal on a lost mobile device. An identifier associated with the lost mobile device allows a locating mobile device to receive the signal from the lost mobile device and filter out interference. The strength of the signal is determined and a location of the lost mobile device is communicated to a user based on the strength of the signal.

13 Claims, 5 Drawing Sheets

LOCATING A NEARBY MOBILE DEVICE WITHOUT USING GPS

SUMMARY

A high-level overview of various aspects of the invention is provided here for that reason, to provide an overview of the disclosure, and to introduce a selection of concepts that are further described in the detailed-description section below. This summary is not intended to identify key features nor essential features of the claimed subject matter, nor is it intended to be used as an aid in isolation to determine the scope of the claimed subject matter.

In a first aspect, computer-readable media having computer-executable instructions embodied thereon that, when executed, perform a method of locating a lost mobile device are provided. The method includes receiving a request to broadcast a signal that can be used to locate the lost mobile device. The method also comprises communicating an identifier from the lost mobile device to a locating mobile device, wherein the identifier describes the signal. The method also comprises broadcasting the signal by the lost mobile device, receiving an indication that the lost mobile device was located, and ceasing to broadcast the signal.

In another aspect, computer-readable media having computer-executable instructions embodied thereon that, when executed, perform a method of locating a lost mobile device are provided. The method comprises communicating, to the lost mobile device, an activation message with instructions to broadcast a signal from the lost mobile device. The method also comprises receiving an identifier from the lost mobile device that identifies the signal. The method comprises receiving the signal from the lost mobile device and determining a strength of the signal. The method also includes communicating a location of the lost mobile device to a user based on the strength of the signal.

In a another aspect, computer-readable media having computer-executable instructions embodied thereon that, when executed, produce a graphical user interface (GUI) for locating a lost mobile device are provided. The GUI comprises a first display area that displays one or more controls for receiving information needed to generate a request to activate a signal on the lost mobile device and a second display area that displays a signal strength of the signal received from the lost mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
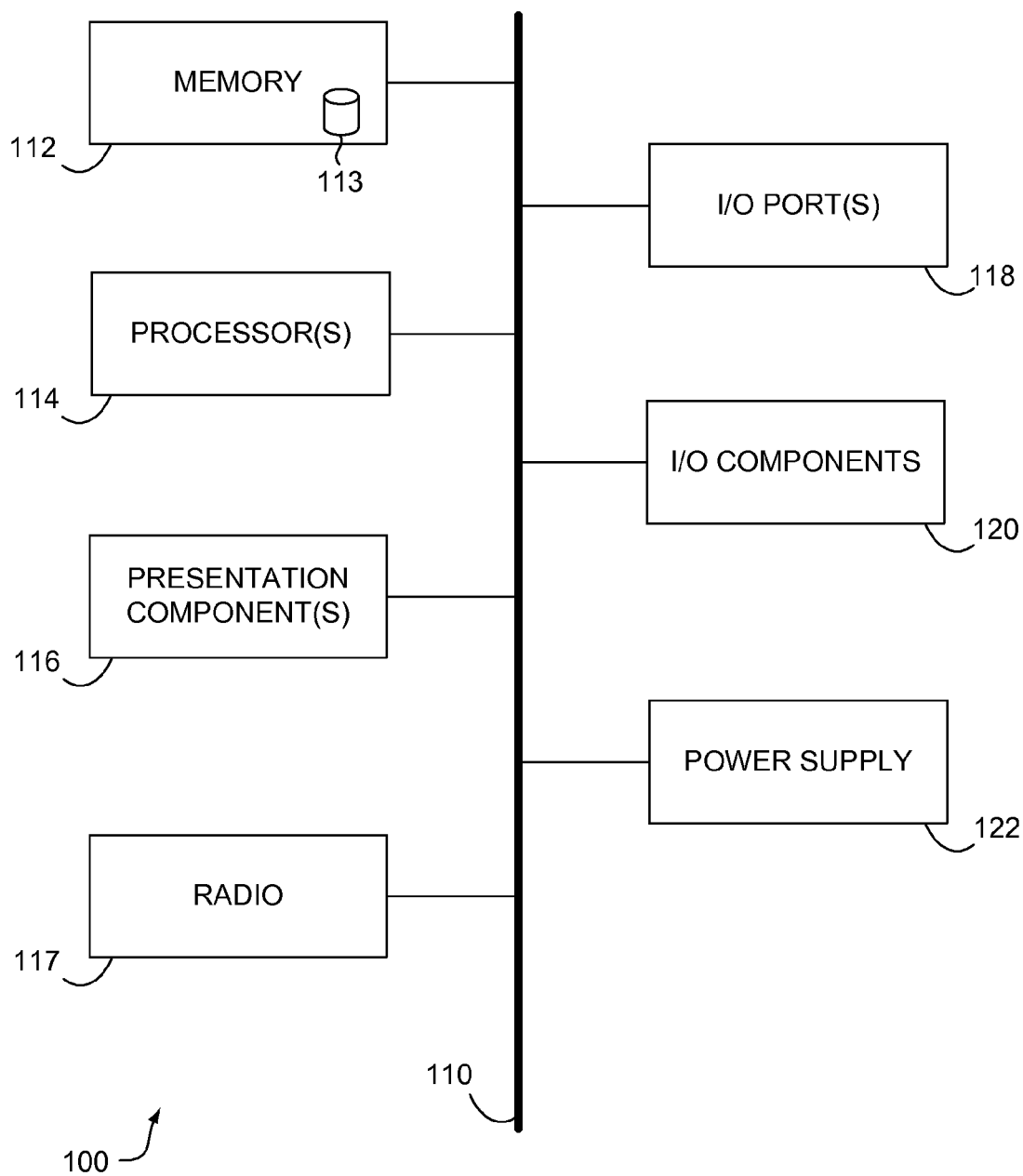
FIG. 1 depicts an illustrative device suitable for use in connection with embodiments of the invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
3G Third-Generation Wireless Telephone Technology
4G Fourth-Generation Wireless Telephone Technology
CDMA Code Division Multiple Access
CD-ROM Compact Disk Read Only Memory
CRM Customer Relations Management
DVD Digital Versatile Discs
EEPROM Electrically Erasable Programmable Read Only Memory
GPRS General Packet Radio Service
GPS Global Positioning System
GSM Global System for Mobile Communications
HLR Home Location Register
iDEN Integrated Digital Enhanced Network
MSC Mobile Serving Center
MMS Multimedia Messaging Service
PC Personal Computer
PCS Personal Communications Service
PDA Personal Digital Assistant
RAM Random Access Memory
RF Radio Frequency
ROM Read Only Memory
SLA Service Level Agreement
SMS Short Message Service
TDMA Time Division Multiple Access
UMTS Universal Mobile Telecommunications Systems
VoIP Voice over IP
Wi-Fi Wireless Fidelity
WiMAX Worldwide Interoperability for Microwave Access Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

Embodiments of the present invention are directed to locating a lost mobile device. A locating mobile device, as used herein, refers to any mobile device associated with activating or receiving a signal, or homing signal, emitted by the lost mobile device. The homing signal may be any radio frequency signal is capable of transmitting or emitting, including Wi-Fi, Bluetooth, and the like.

In one embodiment, the lost mobile device and locating mobile device have a radio capable of emitting and receiving a signal at a specific frequency. In one embodiment, the homing signal is emitted at any commonly used wireless frequency associated with wireless technologies such as CDMA or GSM. Such an embodiment allows any phone, regardless of wireless carrier, to function as the lost mobile device or locating mobile device, as described herein. The signal, once activated, allows the locating mobile device to determine a location of the lost mobile device based on the strength of the signal.

An identifier refers to a unique identifier provided by the lost mobile device that describes or identifies the signal. The identifier allows the locating mobile device to filter out signals from other phones and phone networks (i.e., interference). In one embodiment, the identifier is provided by a base station. In one embodiment, the identifier is a code division (e.g., Walsh code) or code identifier. The code division may be assigned by a wireless tower with which the lost mobile device is communicating. In one embodiment, the identifier includes content that the lost mobile device communicates in the homing signal, such that the locating mobile device filters out signals that do not include the content. In one embodiment, the content is provided by the base station. In one embodiment, the content is selected by the locating mobile device. In one embodiment, the content is selected by the lost mobile device and communicated to the locating mobile device as part of the identifier.

In one embodiment, the lost mobile device communicates the homing signal by establishing and maintaining contact with a base station. The lost mobile device, in one embodiment, or the base station, in another embodiment, communicates a code division to the locating mobile device, as part of the identifier, allowing the locating mobile device to identify the communication signal between the lost mobile device and the base station and use signal to find the lost mobile device.

In one embodiment, the homing signal is emitted on an unused band that is within the frequency band reserved for mobile communication technologies (e.g., CDMA, GSM), but is not used by nearby base stations to communicate with mobile devices. The locating mobile device listens for a signal on the unused band, and filters out other signals. In one embodiment, the homing signal is an unused modulation of the signal (i.e., chirping). In this embodiment, the frequency may be one used for mobile communications, but the modulation of the frequency would distinguish the signal from others signals with the frequency band or even using the same frequency. The modulation may be selected to help refine the distance and location calculation between the locating mobile device and the lost mobile device. The modulation may be selected to not interfere with other nearby signals. The lost mobile device communicates the modulation to the locating mobile device as part of the identifier, allowing the locating mobile device to listen for the chirping.

The request to activate a signal refers to a request made to the lost mobile device, in one embodiment, to send an identifier and begin emitting the signal. A request to deactivate the signal refers to a request made by the locating mobile device, in one embodiment, or the lost mobile device, in another embodiment, to deactivate the signal, such as might be desired when the lost mobile device is located. Both requests may be sent between devices using a telecommunications network. For example, the requests may be specifically coded SMS messages. The special coding allows the SMS messages to be routed to applications that implement embodiments of the present invention without appearing to the user as a text message or otherwise making the user aware the SMS message was received.

Utilizing RF signals associated with a lost mobile device helps determine its location in a manner similar to the "You're Getting Warmer" game. This allows the lost mobile device to be located by using a locating mobile device to receive the RF signals, and based on the signal strength, determine the location of the lost mobile device. Accordingly, a location of a lost mobile device can be determined utilizing RF signals with much greater precision than GPS allows. RF signals do not require line-of-sight to a GPS satellite and provide much greater accuracy in a multi-story setting. For example, utilizing GPS may indicate that a lost mobile device is in a 10-story office building, but cannot provide any additional information regarding the location. In another example, GPS may indicate that a lost mobile device is located somewhere on the property of a residence, but cannot provide any further detail. If a mobile device is lost, for example, on a camping trip, where hills or trees prevent GPS from establishing line-of-sight with a GPS satellite, GPS may not provide any information regarding the lost mobile device's location. The RF signals from the lost mobile device are available, whether inside a multi-story building, under a couch cushion, or in a location with hills or trees, and indicate to a locating mobile device whether the locating mobile device is "getting warmer" until the lost mobile device is located.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

Memory 112 might take the form of one or more of the aforementioned media. Thus, we will not elaborate more here, only to say that memory component 112 can include any type of medium that is capable of storing information in a manner readable by a computing device. In one embodiment, memory 112 includes a set of embodied computer-executable instructions 113 that, when executed, facilitate various aspects disclosed herein. These embodied instructions will variously be referred to as "instructions 113" or "application 113" for short. Processor 114 might actually be multiple processors that receive instructions 113 and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. A wireless telecommunications network might include an array of devices, which are not shown so as to not obscure more relevant aspects of the invention. Components such as a base station, a communications tower, or even access points (as well as other components) can provide wireless connectivity in some embodiments. In embodiments of the present invention, radio 117 also facilitates other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

The mobile device 100 can be any electronic device having radio frequency capabilities, that is, a device capable of emitting or receiving an RF signal. The mobile device may take on a variety of forms, such as a personal computer (PC), a laptop computer, a mobile phone, a personal digital assistant (PDA), or any other device that utilizes RF services as described herein.

With reference to FIGS. 2-6, illustrative screen displays for locating a lost mobile device are provided. It is understood that the illustrative screen displays, or any other screen displays utilized to locate a lost mobile device (collectively, the "screen displays"), are connected logically, such that they comprise a user interface designed to assist in locating a lost mobile device. The screen displays may be from the perspective of the lost mobile device or the locating mobile device used to locate the lost mobile device, and may appear in any order and with any number of screen displays, without regard to whether the screen display is described or depicted herein.

Figure 2:
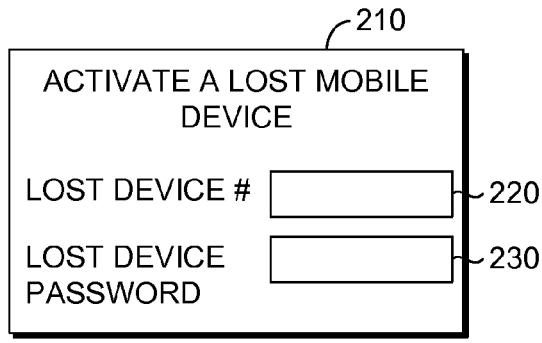
FIG. 2 depicts an illustrative screen display for requesting to activate a signal on a lost mobile device in accordance with embodiments of the invention.

Referring to FIG. 2, in one embodiment, a first display area 210 is configured to display a request to activate a signal on the lost mobile device. Once generated, the request is communicated to the lost mobile device. The lost mobile device will then activate a signal that can be used by a locating mobile device to locate the lost mobile device. The first display area may be displayed on the locating mobile device.

The first display area 210 may include a lost-device-number area 220 for identifying the telephone number associated with the lost mobile device. The telephone number may be used to route the request to the lost mobile device. Other information may be provided to identify the lost phone. For example, a name of a person associated with the lost phone or an email address associated with the owner of the lost phone may be provided. In one embodiment, the phone number for the lost phone may be automatically retrieved from a contact list associated with the user of the remote phone. Once the phone number for the lost mobile device is retrieved from the contact list, it may be used to route the request to the lost mobile device.

The first display area 210 may further include a lost-device-password area 230 for authenticating with an access password associated with the lost mobile device. The access password could be a password used to access the lost mobile device in general. The password could also be specific to an application that activates the signal used to find the mobile device.

Figure 3:
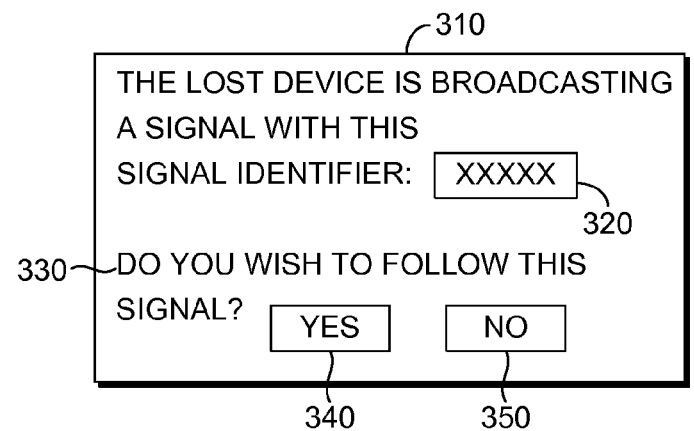
FIG. 3 depicts an illustrative screen display for displaying an identifier associated with a lost mobile device in accordance with embodiments of the invention.

Referring now to FIG. 3, an additional display area 310 is configured, in one embodiment, to display an identifier 320 associated with the lost mobile device. In one embodiment, the user of the locating mobile device is prompted 330 to determine if the user wants to follow the signal 340 or not 350.

Figure 4:
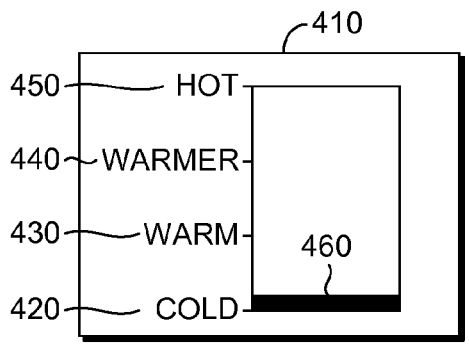
FIG. 4 depicts an illustrative screen display for displaying a signal strength associated with the signal of a lost mobile device in accordance with embodiments of the invention.

Referring now to FIG. 4, a second display area 410 is configured to display a signal strength 460 associated with the signal. The signal strength 460 is presented with indicators, in various embodiments, to help the user determine if the user is near the lost mobile device. The indicators in FIG. 4 include cold 420, warm 430, warmer 440, or hot 450 relative to the lost mobile device. In another embodiment, a directional arrow is used to direct the user to the lost mobile device. The directional arrow may flash or change colors as the locating mobile device approaches the lost mobile device.

Figure 5:
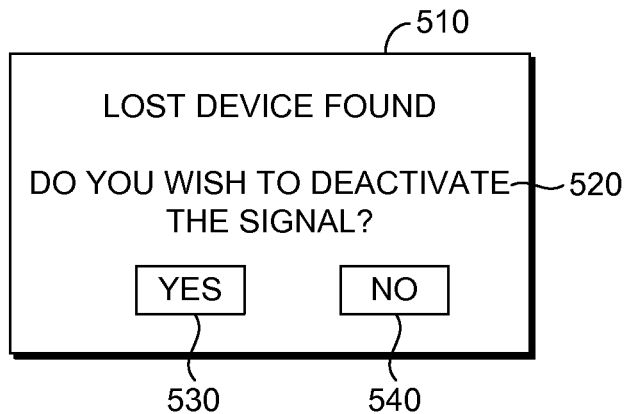
FIG. 5 depicts an illustrative screen display for deactivating a signal in accordance with embodiments of the invention.

Referring to FIG. 5, once the lost mobile device is found, a third display area 510 is configured to prompt a user to deactivate the signal 520. The user may select to deactivate 530 the signal or not 540. When the user selects deactivate 530 then a deactivation message is communicated to the lost mobile device.

Figure 6:
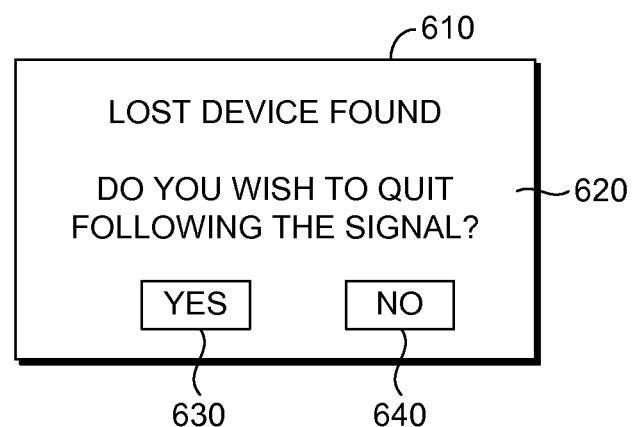
FIG. 6 depicts an illustrative screen display for generating a cancellation request in accordance with embodiments of the invention.

Similarly, referring now to FIG. 6, a fourth display area 610 is configured to prompt the user of the locating mobile device to quit following the signal 620. If the user of the locating mobile device no longer desires to follow the signal, the user may select the discontinue control button 630. If the user desires to continue following the continuous signal, the user may select the continue control button 640.

Figure 7:
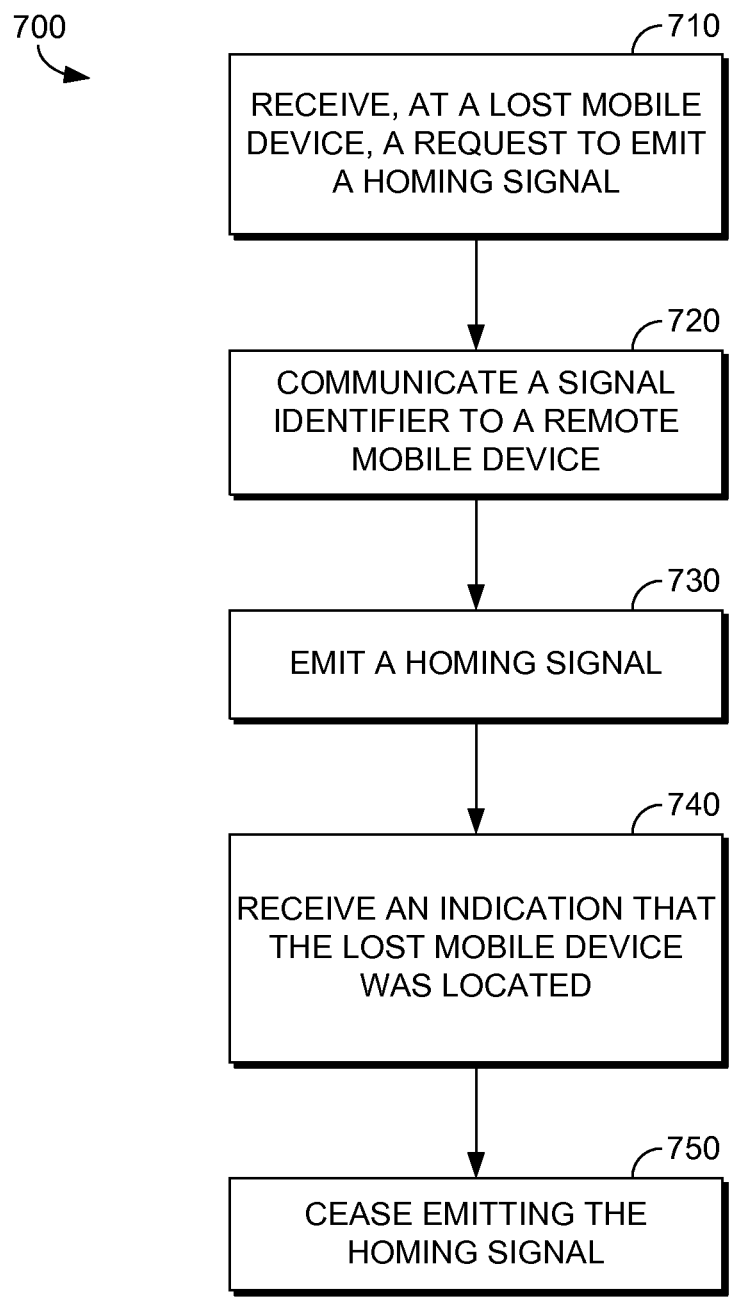
FIG. 7 is a flow diagram depicting an illustrative method of locating a lost mobile device in accordance with embodiments of the invention.

Referring now to FIG. 7, a flow diagram depicting a method 700 of locating a lost mobile device is shown, in accordance with embodiments of the invention. The lost mobile device may perform method 700. Initially, as indicated at step 710, the lost mobile device receives a request to emit a signal. The request is received, in one embodiment, from a locating mobile device. The request may be in the form of an SMS text message. In another embodiment, the request is received as an email. In yet another embodiment, the request is received as an MMS message. In another embodiment, the request is received as a voice call. In yet another embodiment, the request is received via the lost mobile device's voicemail system, wherein a code or password is entered to initiate the request. In various embodiments, the lost mobile device's number is received as part of the request. An access instruction, in one embodiment, is further necessary to activate the signal. In various embodiments, the access instruction comprises a code or password.

Upon receiving the request to emit a signal, at step 720, the lost mobile device communicates an identifier to a locating mobile device. As described above, the identifier refers to a unique identifier associated with the lost mobile device that allows the locating mobile device to filter out signals from other phones and phone networks (interference). The identifier may be communicated via an SMS message or other form of communication.

At step 730, the lost mobile device begins emitting a signal corresponding to the identifier. The signal may be any signal a mobile device is capable of transmitting or emitting. In one embodiment, the signal is an RF signal. In one embodiment, the RF signal is a Wi-Fi signal. In another embodiment, the RF signal is a Bluetooth signal. In one embodiment, the signal is continuously emitted.

At step 740, an indication is received that the lost mobile device was located. The indication may be received from the locating mobile device. In one embodiment, the indication is received by an SMS text message. In another embodiment, the indication is received by email. In yet another embodiment, the indication is received by an MMS message. In another embodiment, the indication is received by a voice call. In yet another embodiment, the indication is received via the lost mobile device's voicemail system, wherein a code or password provides the indication. In another embodiment, the indication is received through an interface on the lost mobile device itself. After receiving the indication, at step 750, the lost mobile device ceases to emit the signal.

Figure 8:
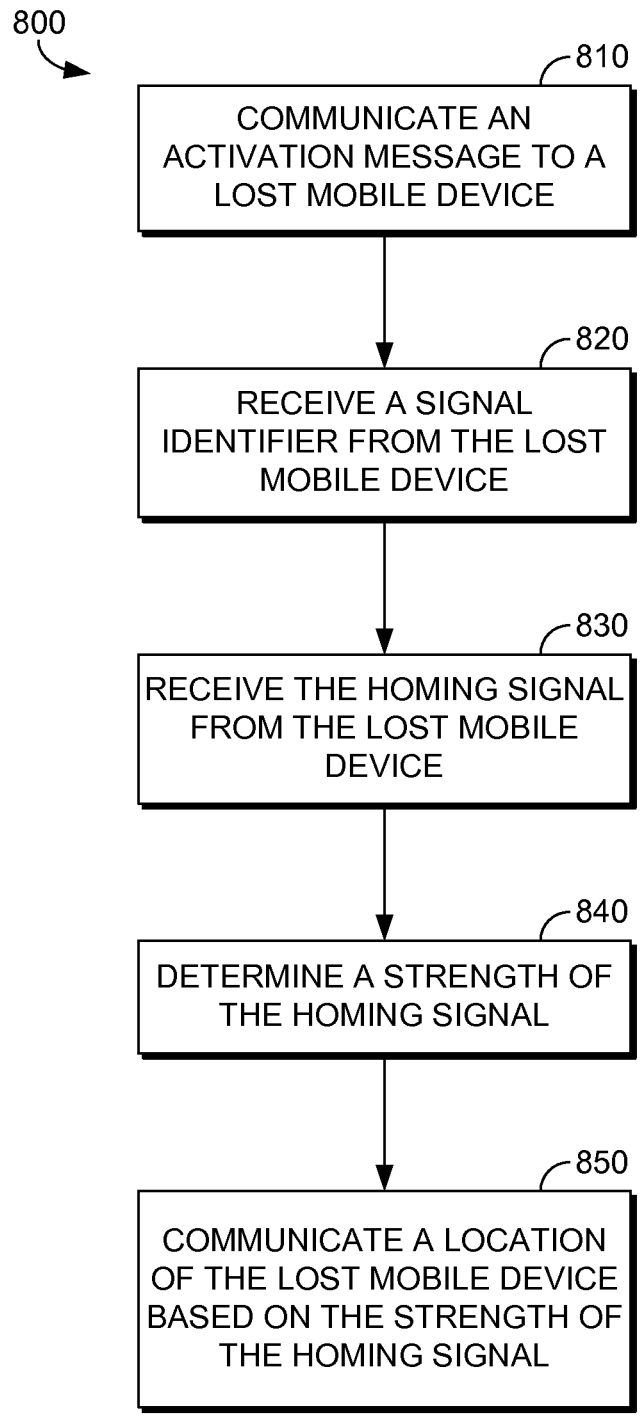
FIG. 8 is a flow diagram depicting an illustrative method of locating a lost mobile device in accordance with embodiments of the invention.

Referring now to FIG. 8, a flow diagram depicting an illustrative method 800 of locating a lost mobile device is shown, in accordance with an embodiment of the present invention. A locating mobile device may perform method 800. Initially, at step 810, the locating mobile device communicates an activation message to the lost mobile device. The activation message comprises instructions to emit a signal from the lost mobile device. In one embodiment, the request is sent as an SMS text message to the lost mobile device. In another embodiment, the request is sent as an email. In yet another embodiment, the request is sent as an MMS message to the lost mobile device. In another embodiment, the request is sent as a voice call to the lost mobile device. In yet another embodiment, the request is sent via the lost mobile device's voicemail system, wherein a code or password is entered to initiate the request. In various embodiments, the lost mobile device's number is sent as part of the request. An access instruction, in one embodiment, is further necessary to activate the signal. In various embodiments, the access instruction comprises a code or password.

Upon successful activation of the signal, at step 820, the locating mobile device receives an identifier from the lost mobile device. As described above, the identifier refers to a unique identifier associated with the lost mobile device that allows the locating mobile device to filter out interference.

At step 830, the locating mobile device receives the signal corresponding to the identifier. As described above, the signal may be any signal a mobile device is capable of transmitting or emitting. In one embodiment, the signal is an RF signal. In one embodiment, the RF signal is a Wi-Fi signal. In another embodiment, the RF signal is a Bluetooth signal.

The locating mobile device, at step 840, determines a strength of the signal. In one embodiment, the strength is determined by calculating the voltage per length or signal power received by a reference antenna associated with the locating mobile device. In another embodiment, the strength is determined by calculating dB-microvolts per meter (dBµV/m) of the signal power received by the reference antenna associated with the locating mobile device.

At step 850, the location of the lost mobile device is communicated to a user. The location is shown, in various embodiments, by a visual indicator, such as a bar graph, in one embodiment, indicating whether the locating mobile device is cold, warm, warmer, or hot. In another embodiment, audible tones are used to identify the proximity of the mobile device. For example, a louder tone, in one embodiment, indicates the locating mobile device is very close to the lost mobile device, or hot. In another embodiment, the frequency of the audible tone indicates whether the locating mobile device is getting close to the lost mobile device.

Many different arrangements of the various components depicted, as well as components not shown, are possible without departing from the scope of the claims below. Embodiments of our technology have been described with the intent to be illustrative rather than restrictive. Alternative means of implementing the aforementioned can be completed without departing from the scope of the claims below. Certain features and subcombinations are of utility and may be employed without reference to other features and subcombinations and are contemplated within the scope of the claims. For example, not all steps listed in the various figures need to be carried out in the specific order described.

The invention claimed is:

1. Non-transitory computer-readable media having computer-executable instructions embodied thereon that, when executed, facilitate a method of locating, without using GPS information, a lost mobile device that is equipped with a radio-frequency ("RF") signal generator, the method comprising:

receiving, at the lost mobile device, via the wireless network, a request to emit a homing signal
  (A) wherein the homing signal is an unused modulated radio frequency (RF) signal that is generated by said RF signal generator,
  (B) wherein said RF signal is not audible, and
  (C) wherein a strength of said RF signal is useable by a locating mobile device to determine a non-GPS derived location of the lost mobile device relative to the locating mobile device and to present at the locating mobile at least one of a visual or audible indicator to indicate a proximity to the lost mobile device;
communicating, to the locating mobile device via the wireless network, an identifier that describes the homing signal from the lost mobile device, wherein the identifier includes information about the homing signal so the locating mobile device can recognize the homing signal and receive the homing signal directly from the lost mobile device;
beginning to emit said homing signal from the lost mobile device;
receiving, at the lost mobile device, an indication that the lost mobile device was located; and
in response to receiving the indication, ceasing to emit said homing signal.

2. The media of claim 1, wherein the request comprises a security code associated with the lost mobile device.

3. The media of claim 2, wherein the request further comprises a telephone number associated with the lost mobile device.

4. The media of claim 1, wherein the request is received via Short Message Service.

5. The media of claim 1, wherein describing the homing signal comprises defining content associated with the homing signal.

6. The media of claim 1, wherein the indication that the lost mobile device was located is received from the locating mobile device.

7. The media of claim 6, wherein receiving the indication that the lost mobile device was located comprises receiving a Short Message Service text message with an access instruction.

8. Non-transitory computer-readable media having computer-executable instructions embodied thereon that, when executed, perform a method of locating a lost mobile device without employing GPS, the method comprising:

communicating, from a locating mobile device to the lost mobile device via a telecommunications network, an activation message with instructions for the lost mobile device to emit a homing signal, which is an unused modulated radio frequency signal and inaudible;
at the locating mobile device, receiving, via the telecommunications network, an identifier that describes the homing signal from the lost mobile device, wherein the identifier includes information about the homing signal so the locating mobile device can distinguish the homing signal from other signals;

at the locating mobile device, receiving the homing signal directly from the lost mobile device;

determining a strength of the homing signal when received at the locating mobile device; and at the locating mobile device, presenting at least one of a visual or audible location indication that indicates a non-GPS derived location including a proximity of the lost mobile device relative to the locating mobile device, wherein said location indication is derived in part on the strength of the homing signal.

9. The media of claim 8, wherein the activation message includes an access instruction.

10. The media of claim 9, wherein the access instruction is operable to activate the homing signal on the lost mobile device.

11. The media of claim 8, wherein communicating the location of the lost mobile device to the user comprises communicating to a user of the locating mobile device varying audible tones operable to distinguish varying degrees of proximity to the lost mobile device.

12. The media of claim 8, wherein communicating a location of the lost mobile device to the user comprises displaying on the locating mobile device varying visual images operable to distinguish varying degrees of proximity to the lost mobile device.

13. The media of claim 8, further comprising communicating an indicator to the lost mobile device indicating that the lost mobile device was located.

* * * * *